March 29, 1960

W. R. PETERSON 2,930,569

APPARATUS FOR MEASURING CHARGES OF COMMINUTED MATERIAL

Filed Aug. 10, 1955

INVENTOR.
WILLIAM R. PETERSON.
BY
ATTORNEYS.

March 29, 1960  W. R. PETERSON  2,930,569
APPARATUS FOR MEASURING CHARGES OF COMMINUTED MATERIAL
Filed Aug. 10, 1955
3 Sheets-Sheet 2
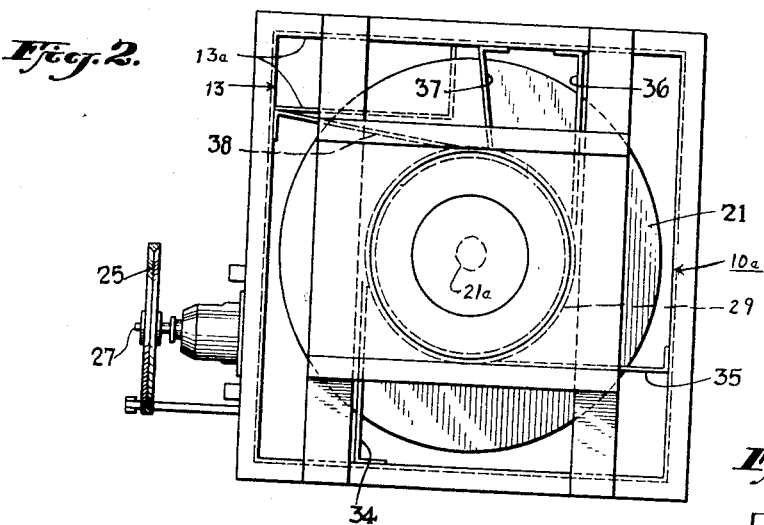
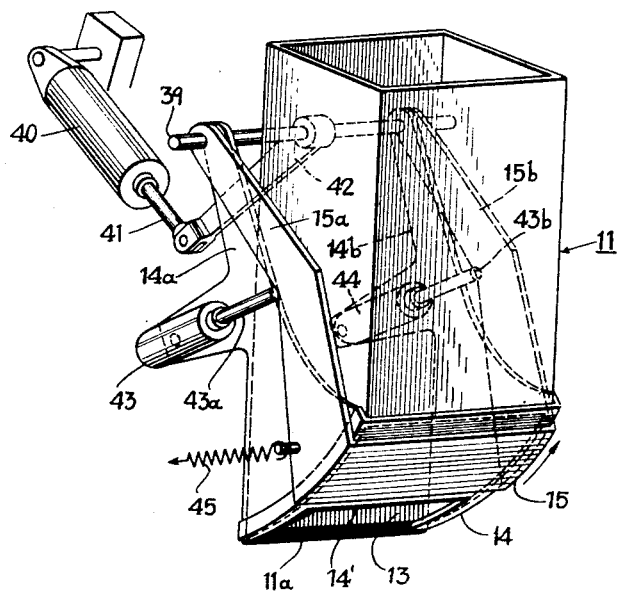
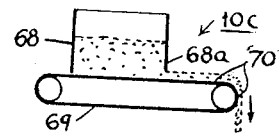
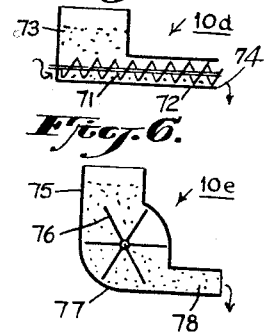
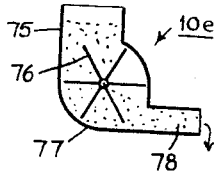
INVENTOR.
WILLIAM R. PETERSON.
BY
ATTORNEYS.

March 29, 1960
W. R. PETERSON
2,930,569
APPARATUS FOR MEASURING CHARGES OF COMMINUTED MATERIAL
Filed Aug. 10, 1955
3 Sheets-Sheet 3
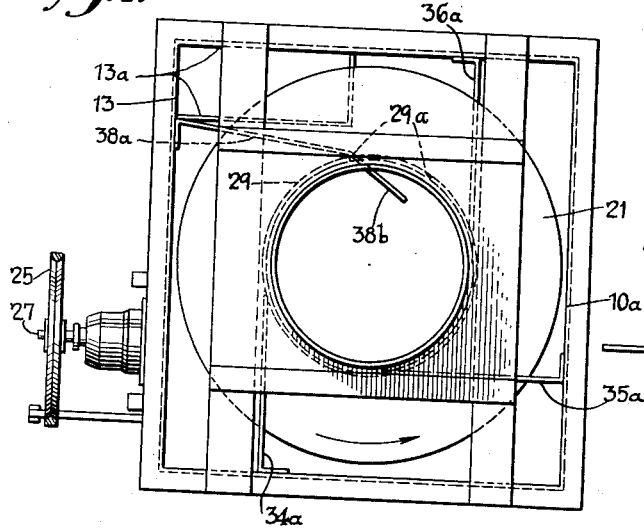
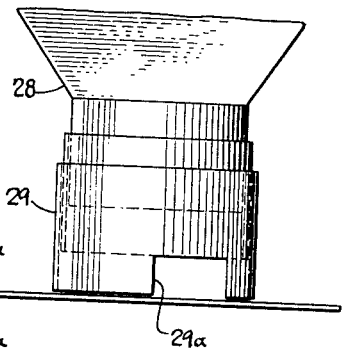
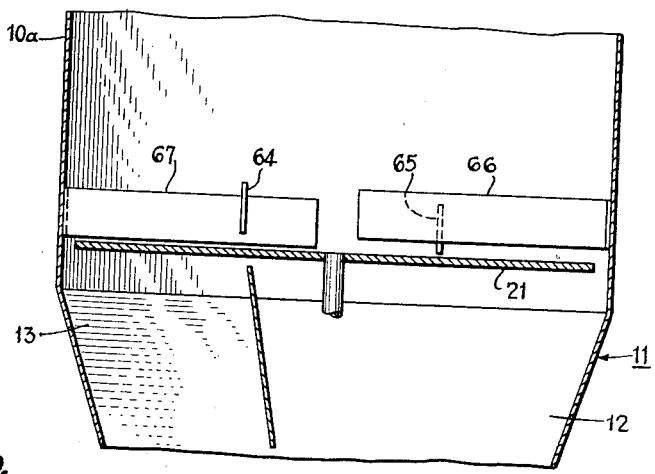
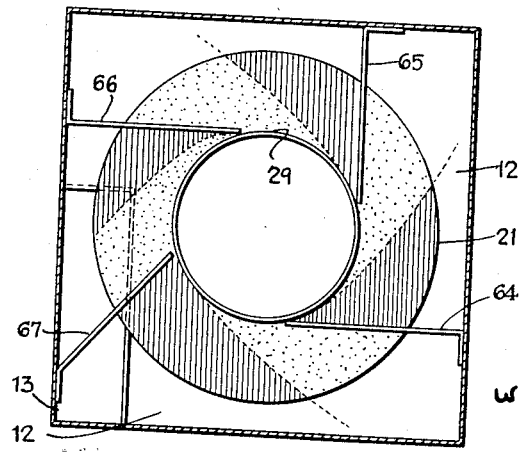
INVENTOR.
WILLIAM R. PETERSON.
BY
ATTORNEYS.

United States Patent Office 2,930,569
Patented Mar. 29, 1960

2,930,569

APPARATUS FOR MEASURING CHARGES OF COMMINUTED MATERIAL

William R. Peterson, South Attleboro, Mass., assignor to St. Regis Paper Company, New York, N.Y., a corporation of New York Application August 10, 1955, Serial No. 527,503

16 Claims. (Cl. 249—43)

This invention relates to means for preweighing a succession of charges of divided solid material such as pulverulent, pelletized or granular material, for example, and more particularly to novel feed control means for such apparatus.

One of the objects of the present invention is to provide a single charge preweighing apparatus which is sufficiently flexible in operation to weigh with high accuracy materials of the class described of different flow characteristics and of different densities.

A further object is to provide a single apparatus of the above character which is capable of providing a highly uniform bulk and dribble flow to the weighing means.

A further object of the invention is to provide a device of the above character which is capable of a high production rate.

This invention, in one aspect thereof, is constituted by novel means for controlling the flow of material from a supply hopper in such a manner that a highly accurate bulk and dribble flow is attained. Such flow control means is referred to as a disc feeder and comprises a horizontal disc or plate which is rotatably mounted beneath stationary plow blade means positioned in such an attitude that rotation of the disc will urge the material thereon against the plow blades and thereby direct the material over the edge of the disc. Such plow blade means are mounted over the marginal portion of the rotatable disc and preferably substantially tangent to a vertical feeder tube centrally located thereover through which the material is conducted to the top of the disc. The mouth of the feeder tube lies in a substantially horizontal plane parallel to the rotatable disc. The flow of the material from the feeder tube onto the disc can be varied by controlling the distance of such mouth from the top surface of the disc. It has been found convenient to vary this distance by means of a slidable collar which surrounds the feeder tube and which may slide up or down along the vertical axis thereof either towards or away from the disc. The collar is held in a raised (bulk flow) position to permit a large flow onto the margin of the disc, and in a substantially lower (dribble flow) position but spaced from the surface of the disc when it is desired to interrupt the larger flow of material. Normally the material will not of itself flow from the feeder tube out over the edge of the disc but requires the assistance of the rotation of the disc in cooperation with the stationary plow blade means. When it is desired to terminate the bulk flow by lowering the collar, as aforementioned, the balance of the charge can be dribbled over the edge of the disc by continued rotation of the disc coacting with the stationary plow blades.

The invention is still another form thereof is similar to the disc feeder above described, with the exception that the plow blade means are divided into two portions, namely, one or more bulk plow blades and one or more dribble plow blades. The bulk plow blades are distinguished from the dribble plow blades in that they are mounted with the lower edges thereof somewhat higher above the rotatable disc than the lower edges of the dribble plow blades. Furthermore, the bulk plow blades are so positioned with respect to the disc and the collar that they plow the bulk charge off of the disc in a selected region. The same is true of the dribble plow blades. Consequently the bulk and the dribble charges are segregated by the particular positioning of the plow blade means and the subdividing thereof into the two aforementioned categories. I have found it desirable, after the major portion of the bulk charge has been fed, to lower the aforementioned collar to a point such that the mouth of the feeder tube (collar) is slightly below the lower edge of the bulk plow blades but slightly above the lower edge of the dribble plow blades. Separate conduits or channels are positioned beneath the rotatable disc, one for the purpose of conducting the bulk charge and a separate channel for conducting the dribble charge whereby the two are maintained separate. Such separate channels constitute portions of a scale flow hopper which is positioned over a suitable scale bucket for receiving preweighed charges of the material. The scale flow hopper is provided with bulk and dribble gate means for its bulk and dribble channels. A scale bucket, mounted upon suitable scale means, is positioned beneath such scale flow hopper to receive material therefrom. Suitable means are associated therewith for controlling: (a) the bulk and dribble gate means, (b) the gap between the rotatable disc and the collar, and (c) the rotation of the disc in response to the weighing movement of the scale bucket.

Various further and more specific objects, features and advantages of the invention will clearly appear from the detailed description given below taken in connection with the accompanying drawings which form a part of this specification and illustrate by way of example preferred arrangements of apparatus for carrying out the invention. The invention consists in such novel combinations of features as may be shown and described in connection with the device herein disclosed.

In the drawings:

Fig. 2 is a top plan view of the upper portion of the apparatus of Fig. 1;

Fig. 3 is a perspective view of the lower portion of a scale flow hopper employed in the invention, together with bulk and dribble gate means associated therewith;

Fig. 4 is a schematic longitudinal sectional view of a belt type feeder which can be employed as one element in one embodiment of the invention;

Fig. 5 is a schematic longitudinal sectional view of a screw or auger type of feeder which can be employed as one element in one form of the present invention;

Fig. 6 is a schematic longitudinal sectional view of a paddle wheel-like impeller feeder which can be employed as one element in one form of the invention;

Fig. 7 is a plan view of a further embodiment of disc feeder means which may be employed in the present invention;

Fig. 8 is a side elevation of the embodiment of the invention shown in Fig. 7;

Fig. 9 is a side elevation of another form of such disc feeder means with certain parts omitted for purposes of clarity and also certain parts partly in section and with parts broken away; and Fig. 10 is a top plan view of the embodiment of the disc feeder means shown in Fig. 9.

Figure 1:
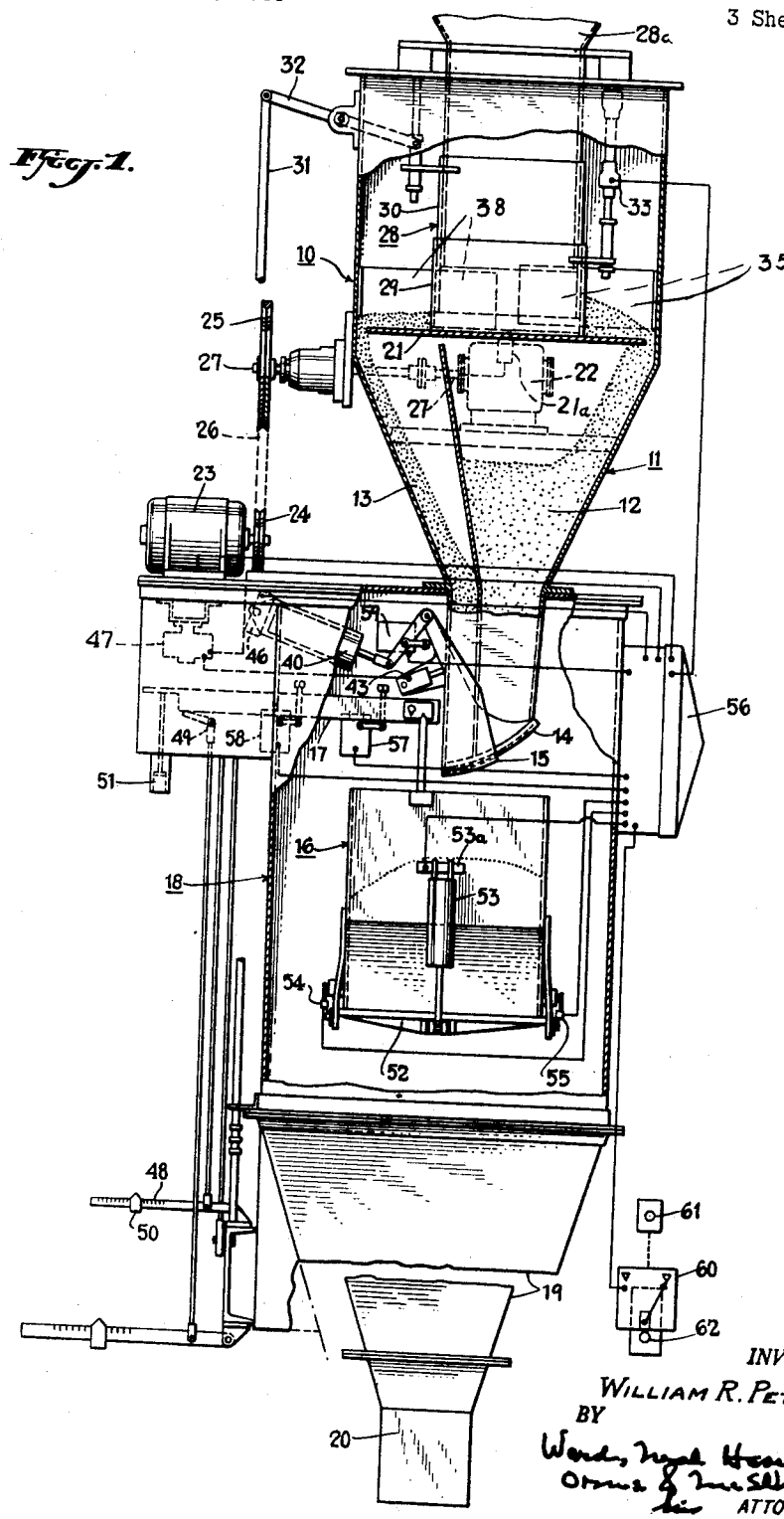
Fig. 1 is a schematic illustration, partly in section and with parts broken away, illustrating one form of apparatus embodying the invention and including schematically a diagram of operative interconnections between certain of the electrically actuated parts.

Referring to the drawings in greater detail, the invention is constituted in general by a disc feeder means 10 which controls the flow of divided solid material such as pulverulent, pelletized or granular material, for example, to a scale flow hopper 11 which is subdivided into separate bulk and dribble channels 12 and 13, respectively.

The dribble channel 13 is well shown in top plan view in Fig. 2 and is defined by the channel elements 13a forming a passage of rectangular horizontal cross-section in the upper lefthand portion of such Fig. 2.

The bulk and dribble channels 12 and 13 are in turn respectively provided with bulk and dribble gates 14 and 15 (Figs. 1 and 3) for the purpose of controlling the flow of material to a scale bucket 16 which is mounted upon suitable weighing means including a scale beam 17. Disc feeder means 10 is provided with a housing 10a (Fig. 2) which is above and integral with the flow hopper 11.

The scale bucket 16, and the scale beam 17, together with the lower part of hopper 11, including gates 14 and 15, are contained within a dustproof housing 18 having a funnel-like lower portion 19, comprising a dump receiving hopper, into which the weighed charges can be dumped from the scale bucket 16. The funnel shaped dump receiving hopper 19 directs dumped charges of material to a suitable bag packer, if valve bags are employed, or, if it is desired to feed the charges to an open mouth bag, a suitable open mouth bag filler neck 20 is employed in combination with which there may cooperate, if desired, a suitable open mouth bag clamping unit (not shown) which may be automatically actuated to release an open mouth bag a preselected time after the dumping of a charge from the bucket 16.

Reverting now to the disc feeder means 10, the latter comprises a horizontal plate or disc 21 rotatably mounted upon a suitable vertical central shaft 21a which, in the form shown, is supported by a suitable gear box 22 which forms part of an operative interconnection of the disc 21 to an electric motor 23 which drives such disc. The motor 23 is operatively connected to the gear box 22 by any suitable means, such as a pulley 24 which transmits torque to a pulley 25 by means of a suitable belt 26, the pulley 25 being mounted upon a shaft 27 which drives the central vertical shaft of the disc 21 via the aforementioned gear box 22.

Material is fed by gravity onto the top surface of the rotatable disc 21 via a vertical feeder tube 28, the lower portion of which is constituted by a primary collar 29 and a secondary collar 30. The function of the primary collar, as aforementioned, is to control the extent of the bulk charge which is accomplished by governing the distance between the lower edge of such collar and the top surface of the disc 21. The lower edge of the collar 29 is in a substantially horizontal plane at all times and the collar, being mounted for vertical sliding movement, is capable of governing the flow of material from the tube onto the disc. The primary collar is operatively associated with the weighing means in such a way that it is shifted from a raised or bulk flow position to a lowered or dribble flow interrupting position in repsonse to weighing movement of the scale beam 17.

The secondary collar 30, on the other hand, comprises a sleeve-like member which also is mounted for vertical sliding movement along the axis of the feeder tube but is manually adjustable, for example, by a suitable handle (not shown) located in a position convenient to the operator and interconnected by means of a linkage, a part of which is shown at 31, 32.

The primary collar 29, on the other hand, is under the influence of an air cylinder 33 for shifting same axially, it being understood, of course, that any other suitable power means can be employed for this purpose.

Cooperating with the rotatable disc 21 are:

(a) Four bulk plow blades 34–37, inclusive. These plow blades are so positioned that rotation of the disc 21 in a counterclockwise direction (Fig. 2) will urge material over the edge of the disc and into the bulk channel 12. Plow blades 34–37, inclusive, for example, are of flat generally rectangular strip-like conformation and are stationary, being secured at their outer extremities to the housing 10a, as shown in Fig. 2. They are substantially tangent to collar 29.

(b) A single dribble plow blade 38, which is positioned in such a manner that rotation of the disc with material upon it will cause a portion of the charge to fall from the disc into the dribble channel 13. Plow blade 38 is generally similar in configuration to blades 34–37 and also is secured at its outer end to housing 10a.

As aforementioned, the bulk plow blades are positioned higher above the disc 21 than the single dribble plow blade, for example, the bulk plow blades may be positioned about ½ inch above the disc and the dribble plow blade ⅛ inch.

When the disc 21 has rotated sufficiently, after lowering of the primary collar 29, whereby all of the bulk portion of the charge has been plowed off, further rotation of the disc will cause the dribble plow blade to continue to urge material over the edge of the disc despite the fact that such primary collar 29 is in its lowered or dribble position. In the latter position, a small flow of material still may pass on to the disc into the path of the dribble plow blade from the feeder tube 28 and its superimposed main feeder bin 28a.

I have found it desirable in operation, in order to attain unusually accurate weighings, to lower the primary collar 29 from its bulk feed position raised above the bulk plow blades, to a lowermost position with the lower edge of the collar below the lower edge of the bulk plow blades but slightly above the lower edge of the dribble plow blade.

Referring now to Fig. 3, the bulk and dribble gate means will now be described. A common shaft support for the two gates 14 and 15 is provided at 39 which is referred to herein as the gate support shaft. To the latter are rigidly secured a pair of bulk gate arms 14a and 14b. Angularly shifting the gate support shaft 39 will angularly shift the bulk gate 14. The position of the latter is under the influence of a main air cylinder 40 having a piston rod 41 which, by means of an arm 42, is capable of angularly shifting the gate support shaft 39 thereby to open or close the bulk gate 14.

The bulk gate 14 is conformed in such a way that it may be fully closed thereby to interrupt the flow of material through the bulk channel 12 but will not interrupt the flow of material via the dribble channel 13, the latter interruption being accomplished solely by the dribble gate 15.

Consequently the bulk gate 14 is provided with a suitable cutaway portion 14′, as well illustrated in Fig. 3, to permit the flow of material via the dribble channel 13 despite the closure of the bulk gate.

The dribble gate 15 is mounted upon the gate support shaft 39 via arms 15a and 15b which are not secured to the shaft 39 but are permitted to shift freely angularly thereon under the influence of the means to be described hereinafter.

The gates 14 and 15 thus have a common axis of angular movement and the gate 15 may be held open under the influence of a pair of small air cylinders 43 and 44 which respectively are mounted upon the arms 14a and 14b. These air cylinders respectively mounting small piston rods 43a and 43b are positioned in such a way that when such rods are extended, it is impossible for the dribble gate 15 to move to a closed position.

However, when the small air cylinders 43, 44 are deenergized and their piston rods retracted, the dribble gate 15, under the influence of spring means, as at 45, will move to a fully closed position, thereby to interrupt the dribble flow in the channel 13.

The lower neck of the scale flow hopper 11 (Fig. 3) in the region 11a is provided with a suitable resilient seal made, for example, of rubber or rubber-like material, against which the dribble gate can seal the flow of the dribble charge.

When the bulk gate opens automatically it also swings open the dribble gate. At the same time the small air cylinders 43 and 44 are energized thereby extending their respective piston rods. This uncovers the dribble opening in the bulk gate. This differential of position between the gates is maintained for a while after the bulk gate is closed. The dribble gate closes completely only when the piston rods 43a and 43b are retracted.

The main air cylinder 40 is under the influence of a suitable solenoid operated air valve 46 (Fig. 1) and the two small air cylinders 43 and 44 in turn are under the influence of a common solenoid operated valve 47.

The scale beam 17 is operatively connected to the scale bucket 16 and to a suitable weight in a conventional manner. The scale beam is free from so-called free hanging counterweights which might otherwise interfere by oscillation with accurate weighing.

A manually adjustable scale beam booster 48, 49 preferably is employed in order to assist in attaining a positive initial scale movement in order to control the shutting off of the bulk stream as will appear below. The manually adjustable feature, for example, comprises a manually adjustable weight 50 which may be shifted in position as desired to increase or decrease the extent of the bulk charge and thus to increase or decrease the time of the dribble charge.

Furthermore, a scale dashpot 51 of small size may be employed for dampening the motion of the scale beam thus to insure its smooth and steady movement.

The scale bucket 16 may be suspended from the scale beam 17 by any suitable means. For example, conventional knife edges and a check rod (not shown) may be connected to the bucket to prevent it from oscillating when weighing or while dumping the weighed charge.

The scale bucket 16 is provided with suitable dump gates 52 which are under the influence of a dump gate air cylinder 53.

To the scale bucket 16 are secured a pair of microswitches 54 and 55 which respectively are for:

(a) Actuating the dump gate air cylinder in response to the dump gate swinging fully open thereby to close such gates; and (b) Opening the bulk and dribble gates 14 and 15 in response to the gates 52 swinging shut, starting the rotation of the disc 21, and moving the primary collar 29 to its raised or bulk flow position.

The function of these switches will more fully appear hereinafter in connection with the description of the operation of the invention.

The scale bucket air cylinder 53, in the form shown, is provided with a solenoid air valve 53a which is operatively connected to suitable electrical control means 56 to which the other electrical elements of the device are connected for accomplishing the sequence of operation to be set forth below.

On the scale beam 17 there are mounted two microswitches 57 and 58 which are respectively referred to as the bulk arrest microswitch and the dribble arrest microswitch. The former operates in response to the first scale movement of the scale beam to shut off the bulk flow and the latter in response to further weighing movement of the scale beam when a full charge is received in the scale bucket 16, thereby to shut off the dribble flow.

Positioned in proximity to the dribble gate arms 15a, 15b in such manner as to cooperate therewith is a scale bucket dump microswitch 59 (Fig. 1) which is actuated in response to the closing of the dribble gate 15 to dump the contents of the scale bucket 16 through the intermediary of the air cylinder 53.

In operation, the initial conditions assumed to exist are as follows:

(1) The main supply bin 28a has an ample supply of material of the class described;

(2) The primary collar 29 is in its up or raised position wherein a bulk charge may flow via the feeder tube 28;

(3) The bulk and dribble gates 14 and 15 are both closed and the main and small air cylinders 40 and 43, 44 are deenergized;

(4) The disc feeder motor 23 is stopped;

(5) The scale bucket 16 is empty and its dump gates 52 are closed;

(6) The scale flow hopper (or disc feeder hopper) 11 at the outset of the operation will be empty but if the machine has been previously operated, it will contain a reserve partial charge which may amount up to about 85% of the total charge to be received in the scale bucket 16.

The device can be operated automatically on a pace-setting basis, the charges dropping in sequence and the cycle commencing immediately thereafter for repetition. Also the invention can be operated manually whereby the charges are called by a manually operated switch and as needed. A "manual-automatic" switch 60 may be employed which is operatively connected to the electrical control means 56 and which may be shifted to either one of the desired positions. When the switch 60 is set for manual operation, the charge may be called by pressing a button 61 and when such switch is set upon "automatic," as shown in Fig. 1, the operation of the device can be initiated by manual closing of a switch 62.

The closing of the manually operated switch 62, when set on "automatic," has the following effects:

(1) The disc feeder motor 23 is started via the electrical control means 56.

(2) The bulk and dribble gates 14, 15 are opened simultaneously in response to energization of their solenoid operated valves 46, 47, respectively. Such valves in turn actuate their respective air cylinders 40 and 43, 44.

(3) The "bulk reserve" which may have existed in the scale flow hopper 11 by virtue of previous operation is dumped into the scale bucket 16 followed by a bulk stream from the disc feeder 10.

(4) Any "dribble reserve" which may have collected in the dribble channel 13 is similarly dumped into the scale bucket 16 in turn followed by the dribble stream.

(5) The scale beam 17 reacts to:
(a) Receipt of the bulk charge; and
(b) The booster device 48—50 thereby to actuate the bulk arrest microswitch 57.

(6) The actuation of the microswitch 57 has the following effects:

(a) The bulk gate 14 is closed as a result of the energization in the correct direction of the main air cylinder 40;

(b) The dribble gate 15 under the influence of the spring 45 attempts to follow the bulk gate to a closed position but is unable to do so because of the small air cylinders 43, 44 which are energized with the piston rods thereof in an extended condition;

(c) The sliding primary collar 29 drops from its raised or bulk position to its low or dribble position, the lower edge of such collar dropping below the lower edge of the bulk plow blades 34–37 but preferably slightly above the lower edge of the dribble plow blade 38.

(7) The rotatable disc 21 continues to rotate and (a) The bulk plow blades coacting therewith plow a substantial amount of the material off the edge of the disc, which material has been collected or trapped thereon after lowering of collar 29, such material being directed into the bulk channel 12.

(b) The dribble plow blade 38 plows off the disc the balance of the charge via the dribble channel 13, thereby building up a full charge in the scale bucket 16.

When final weight of charge is attained in the scale bucket 16, the scale 17 again undergoes weighing movement thereby to actuate the dribble arrest microswitch 58.

(8) Actuation of the dribble arrest microswitch 58 has the following effects:

(a) The extended piston rods 43a, 44a of the small cylinders 43, 44, are retracted by virtue of the actuation of the solenoid operated valve 47. Thus the dribble gate is closed.

(b) The disc feeder motor 23 is stopped.

(9) The closing of the dribble gate 15 in turn actuates the aforementioned microswitch 59 with the following results:

(a) The contents of the scale bucket 16 are dumped by the actuation of the air cylinder 53 thereby opening the dump gates 52.

(b) When the dump gates 52 have swung fully open, they actuate the microswitch 54 which, by means of the electrical control means 56, causes the air cylinder 53 to reverse its operation thereby to close the gates 52.

(10) The closing of the gates 52 in turn actuates the microswitch 55 at the bottom lip of the scale bucket with the following effects:

(a) The bulk and dribble gates 14 and 15 are automatically opened by actuation of their respective air cylinders 40 and 43, 44.

(b) The disc feeder motor 23 is started again.

(c) The primary collar 29 is raised by actuation of the air cylinder 33 through a set stroke to its uppermost or bulk flow position.

One of the principal advantages of the structure above described is that it attains a substantially uniform bulk charge. That is, all of the bulk charges measured over a series thereof are substantially the same weight, each such bulk charge comprising a substantial percentage of the total charge. Of course, one of the principal objects of the invention is to attain as high a bag-filling rate as possible with the highest possible accuracy. I have found that a heretofore unattained bag-filling rate with a heretofore unattained accuracy is achieved by this invention by the careful metering of the bulk charge. Such metering is accomplished by an accurate measurement of the bulk reserve charge which is trapped in the bulk channel 12 of the scale hopper 11 between the bulk gate 14 and the lowered collar 29. Thus when the scale beam 17 undergoes its first weighing movement in response to the receipt in the scale bucket 16 of the bulk charge, simultaneously the bulk gate 14 is closed and the collar 29 is lowered from its uppermost to its lowermost position thereby shutting off any further bulk flow. This traps all of the material between the gate and the collar and thus traps such material in the process of falling from the disc into the scale bucket 16 and an increment of such material on the margin of the disc between the collar 29 and the disc's outer edge. Such increment is of course plowed off of the disc promptly after the lowering of the collar 29 and is thus directed into the bulk channel 12. Such bulk reserve charge so trapped in channel 12 is held for the next succeeding charge. It does not necessarily constitute the entire bulk charge but preferably constitutes most of such bulk charge. Illustratively, if the full charge is 50 lbs., the bulk charge may be 45 lbs. and the bulk reserve charge so trapped between gate 14 and the collar 29 may be 35–40 pounds.

When the bulk gate 14 opens thereafter under circumstances set forth above, the collar 29 is lifted to permit a bulk flow and the bulk feed immediately recommences. The bulk reserve charge is immediately dumped into the scale bucket 16 when the bulk gate 14 is opened and the full bulk charge is built up thereafter in such bucket from the bulk stream plowed off the disc 21 (plus the relatively smaller dribble feed plowed off such disc).

The trapping of the bulk reserve charge by the simultaneous closing of the gate 14 and the lowering of the collar 29 is one of the principal reasons for achieving a high uniformity in weight of a succession of bulk charges. The proportion of such bulk charge as compared with the total charge is carefully selected in order that it reach the maximum amount possible and still provide an adequate dribble charge.

In order to achieve high weight accuracy, the dribble charge should not be too small and hence the time for dribbling such charge should not be too short. If the bulk charge is excessive, that is if the machine overshoots the mark in its metering of a preselected bulk charge, the dribble charge and dribble time become too short thereby tending to cause inaccurate weights. Conversely, if the filling machine feeds bulk charges which are too light, then the dribble time becomes excessive thereby preventing a high production rate. These difficulties are overcome by the presence invention.

In other and non-equivalent embodiments of the invention, the disc feeder components (Fig. 1) (21, 29, 34–37) can be replaced by other suitable feeders, for example belt feeder means 10c (Fig. 4), a screw feeder 10d (Fig. 5), or a paddle wheel-like impeller feeder 10e (Fig. 6). That is, the aspect of the invention relating to the trapping of the bulk reserve charge by a so-called double cut-off between the gate 14 and the collar 29 can be achieved in such other embodiments employing such other types of feeders.

Furthermore, I have found it desirable to employ a suitable temporarily actuated scale lock for locking the scale beam 17 temporarily at the time of the dumping of the bulk reserve charge into the scale bucket 16 thereby to prevent an unintended or undesired movement of the scale beam which might actuate the microswitches 57 and 58 prematurely.

The form of the invention shown in Fig. 7 is substantially identical to that shown in Fig. 2 with the exception that the blade 37 is omitted. The bulk plow blades 34a, 35a and 36a are respecively identical in construction and location to the blades 34, 35 and 36. The dribble plow blade 38a, however, is altered in its conformation as compared to plow blade 38 of Fig. 2 in that it is provided with an extension 38b which protrudes into the collar 29 through an opening 29a (Fig. 8) which opening is formed in the lower margin of such collar 29. Note that the collar 29 is also refered to as a primary collar part.

The height of the opening 29a is adequate to accommodate the height of the blade 38a, or at least the extension portion 38b thereof when the primary collar 29 is either in its raised or lowered position. The width of such opening 29a is adequate to permit the outflow of comminuted material from within the collar 29 onto the disc 21 as a result of the rotation of the disc, even though the primary collar 29 has been lowered.

The function of the extension 38b and opening 29a is to aid in producing a more uniform dribble stream by extracting additional material from within the feeder tube 28 of primary collar 29. The dribble stream thus is improved over that of the prior embodiment because more uniform. Further the dribble stream is more positive in that it is of somewhat greater proportion as compared to the dribble stream of the apparatus shown in Fig. 2.

The perpendicular distance between the face of the extension 38b and the righthand edge of the opening 29a, as viewed in Fig. 7, can be selected to permit a desired flow when the primary collar 29 is down and, of course, in response to the rotation of the plate.

Referring now to Figs. 9 and 10, there is again shown a disc feeder means having bulk plow blade means and dribble plow blade means which are substantially similar to the somewhat analogous means of Fig. 2, with the exception that again in the form shown in Figs. 9 and 10 the bulk plow blade 37 of Fig. 2 is omitted. Furthermore, blades 64, 65 and 66 of Figs. 9 and 10 are respectively analogous to blades 34, 35 and 36 of the embodiment of Fig. 2. And a dribble plow blade 67 is employed in the embodiment of Fig. 10 which is analogous in function to dribble plow blade 38 of Fig. 2.

The principal distinction between the embodiment of Fig. 10 and that of Fig. 2 is the aforementioned omission of the bulk blade 37 and also the relative lowering of the lower edge of the bulk plow blade 66 as compared to the level of the lower edge of bulk plow blade 36.

The bulk plow blade 66 preferably is as close to the disc 21 as the dribble plow blade 67. The dribble plow blade 67 is, of course, spaced above the disc 21 but at a distance analogous to that of the dribble plow blade 38 in Fig. 2.

The reason for so lowering the bulk plow blade 66 is to insure that a uniform amount of material is scraped into the dribble channel 13.

By way of illustration only, if we assume that the bulk plow blades 64 and 65 are so positioned that the lower edges thereof are about three-quarters of an inch above the disc 21, whereas the bulk plow blade 66 and the dribble blade 67 are scraping against the top surface of the disc or spaced therefrom merely an amount sufficient to prevent any undesired friction between the two, it will be seen that when the primary collar 29 is lowered from a therefore higher position, there will be a substantial amount of material accumulated and piled upon the disc 21 exterior to the collar 29, and that such piled material, between blades 67 and 65 as measured counterclockwise in Fig. 10, will be scraped off the disc 29 and into the bulk channel 12 by the blades 64 and 65 down to a depth of three-quarters of an inch, that is, such blades 64 and 65 will level the material upon the disc (as so measured between blades 67 and 65) to a depth of three-quarters of an inch, the material above such level being scraped into such bulk channel. However, all the material which passes under blade 65 and then is brought up against the bulk plow blade 66 will be scraped over the edge of the disc because of the lower position of the latter blade.

Hence the material on the disc (exterior to collar 29 at the instant of the lowering of such collar) between the blades 67 and 64, as measured counterclockwise, will be scraped therefrom leaving a layer thereof three-quarters inch deep, and the same will be true of the material upon the disc between the blades 64 and 65 at such instant of the lowering of the collar 29. However, all of such three-quarter inch deep layer of material will eventually be brought up against the blade 66 in response to the rotation of the disc 21 and will be scraped therefrom. Further, all of the material on the disc, exterior to the collar and between blades 65 and 66 as measured counterclockwise will be scraped over the side of the disc by blade 66.

The effect of this is to insure that the total extent of the dribble charge is determined by the material upon the disc between the blades 66 and 67 at the time the collar 29 is lowered.

If desired, the length of the dribble blade 67 can be as shown in Fig. 10, that is, extending from a point well outside the disc periphery, e.g., from the housing 10a into substantial scraping engagement with collar 29, that is, to a point close to but slightly spaced from the collar 29. The inner extremity of blade 67 is preferably but not necessarily substantially tangent to the circular primary collar. Although blade 67 can extend radially from collar 29 a better scraping action thereof occurs when it is tangent or nearly tangent to such collar, as in Fig. 10. Alternatively, the dribble plow blade 67 can be provided with an extension analogous to the above-described extension 38b (Fig. 7) which can protrude into the interior of the collar 29 in a similar manner through an opening (not shown) thereby to provide a feeding of the dribble charge analogous to that described in connection with Figs. 7 and 8.

However, the dribble charge which is fed into the dribble channel 13 in the form shown in Fig. 10 is limited by the volume of material on the disc between the bulk plow blade 66 and the dribble plow blade 67 at the instant of the lowering of the collar 29. Hence, the dribble stream is of substantially greater accuracy because of the metering action of the two blades 66 and 67 in cooperation with the collar 29.

Referring to Figs. 4, 5 and 6, the belt feeder means broadly designated 10c is constituted by a hopper 68 positioned above an endless belt 69, the portion of such belt directly beneath the hopper 68 comprising the bottom of the latter. A lower edge or lip 68a of the hopper 68 is raised above the surface of the belt a sufficient distance to permit a stream of material 70 to flow thereunder. The remaining lower edges of the hopper are spaced sufficiently close to the belt 69 to prevent the leakage of material thereunder. Alternatively, suitable ridges may be provided running along the length of the belt and adjacent to the lower edges of two opposite sides of the hopper to prevent such leakage. A suitable adjustable gate (not shown) can be provided for regulating the size of the opening below lip 68a.

Referring to Fig. 5, the screw feeder 10d comprises an auger or screw 71 which is rotatable within a screw housing 72, the latter being fed with pulverulent material from a hopper 73, there being a suitable outlet 74.

In Fig. 6, the feeder means 10e includes a hopper 75 positioned above a paddle wheel-like impeller feeder 76 which is rotatably mounted within a housing 77 which is provided with a tube outlet 78 for directing a stream of material therefrom.

What is claimed is:

1. In apparatus of the class described, a scale flow hopper having two separate channels therein respectively for bulk ad dribble charge flow and having bulk and dribble gate means respectively for such channels for controlling the outflow therefrom; means for controlling the inflow to such channel including: disc feeder means for such scale flow hopper positioned above the latter, said disc feeder means including a disc member mounted for rotation about a substantially vertical axis, means for feeding divided material onto said disc member including a feeder tube, said tube having a mouth, the edge of which is movable relative to said disc member thereby to regulate the gap therebetween and thus to adjust the flow of such material onto that portion of such disc member extending radially beyond the periphery of said tube, the margin of said disc member extending substantially beyond the periphery of the mouth of said tube; primary bulk plow blade means positioned with the lower edge portions thereof spaced at least at a primary selected distance above said disc member and exterior to said tube for moving the material into the aforementioned bulk channel of the scale flow hopper in response to rotation of said disc member; dribble plow blade means positioned with the lower edge portions thereof a lesser distance above said disc member for plowing the material into said dribble channel; said plow blade means being spaced at angular intervals about said axis; secondary bulk plow blade means having the lower edge portions thereof positioned at a distance above such disc member substantially equal to such lesser distance; scale means having a scale bucket beneath said scale flow hopper; and means for controlling said gate means and the gap between said disc and tube mouth in response to weighting movement of said scale bucket.

2. In apparatus of the class described, a scale flow hopper having two separate channels therein respectively for bulk and dribble charge flow; means for controlling the inflow to such channels including: disc feeder means for such scale flow hopper positioned above the latter, said disc feeder means including a disc mounted for rotation about a substantially vertical axis, means for feeding divided material onto said disc including a feeder tube above such member, said tube having a mouth, the edge of which is positionable relative thereto to regulate the gap therebetween thereby to adjust the flow of such material past the edge of such tube and onto said disc, the margin of said disc extending substantially beyond the periphery of the mouth of the tube; primary bulk plow blade means positioned with the lower edge portions thereof spaced at least at a primary selected level above said disc and exterior to said tube for moving the material above such level into the aforementioned bulk channel of the scale flow hopper in response to rotation of said disc; dribble plow blade means positioned with the lower edge portions thereof a lesser distance above said disc for plowing the material into said dribble channel; and secondary bulk plow blade means having the lower edge portions thereof positioned at a level above such disc member substantially lower than such primary level.

3. In apparatus of the class described, a scale flow hopper having two separate channels therein respectively for bulk and dribble charge flow; disc feeder means for such scale flow hopper positioned above the latter, said disc feeder means including a disc mounted for rotation about a substantially vertical axis, means for feeding divided material onto said disc including a feeder tube above such member, said tube having a mouth, the edge of which is movable relative thereto to regulate the gap therebetween thereby to adjust the flow of such material past the edge of such tube and onto said disc, the margin of said disc extending beyond the periphery of the mouth of the tube; a plurality of bulk plow blades positioned with the lower edges thereof spaced at least at a primary selected level above said disc and exterior to said tube for moving a selected portion of the material above such level into the aforementioned bulk channel of the scale flow hopper in response to rotation of said disc; a dribble plow blade positioned with the lower edge thereof a lesser distance above said disc for plowing the material into such dribble channel; at least one of said bulk plow blades having the lower edge thereof positioned at a distance above such disc member substantially equal to such lesser distance; scale means having a scale bucket beneath said scale flow hopper; and means for controlling the height of said tube above said disc member and hence the gap between said disc and tube mouth in response to weighing movement of said scale bucket.

4. In apparatus of the class described, the combination including: a substantially horizontal disc mounted for rotation about a substantially vertical axis; a tube member for delivering divided material onto said disc, said tube member being positioned thereabove and having a mouth, the edges of which are positionable close to said disc member whereby the longitudinal axis of said tube member is substantially normal to said disc, means for mounting said mouth and disc for relative movement, the margin of said disc extending beyond the periphery of said mouth; bulk plow blade means positioned above said disc and exterior to said tube and mouth, the lower edge portions of a part of said bulk plow blade means being positioned above said disc at a selected level, the lower edge portion of another part of such bulk plow blade means being positioned above such disc at a lower level; dribble plow blade means positioned above said disc with the lower edges thereof closer thereto than said selected distance, such other part of said bulk plow blade means being angularly spaced from but next to said dribble plow blade means; a scale flow hopper positioned beneath said disc and being divided into two separate channels respectively for bulk and dribble flow, said bulk plow blade means being positioned for plowing the material off said disc and into such bulk channel, said dribble plow blade means being similarly positioned with respect to the dribble channel of said scale flow hopper; bulk and dribble gate means for said scale flow hopper bulk and dribble channels; a scale bucket positioned beneath said bulk and dribble gate means; scale means for such scale bucket; means for controlling the spaced relationship between said disc and tube and also for controlling said gate means in response to weighing movement of said scale bucket.

5. In apparatus of the class described, the combination including: a substantially horizontal disc mounted for rotation about a substantially vertical axis; a tube member for delivering divided material onto said disc, said tube member being positioned thereabove and having a mouth, the edges of which are positionable close to said disc member, means for mounting said mouth and disc for relative movement, the margin of said disc extending beyond the periphery of said mouth; bulk plow blade means positioned above said disc and exterior to said tube and mouth, the lower edge portions of a part of said bulk plow blade means being positioned above said disc at a preselected level, the lower edge portion of another part of such bulk plow blade means being positioned above such disc at a lower level; dribble plow blade means positioned above said disc with the lower edges thereof closer thereto than said selected distance; and a scale flow hopper positioned beneath said disc and being divided into two separate channels respectively for bulk and dribble flow, said bulk plow blade means being positioned for plowing the material off said disc into such bulk channel, said dribble plow blade means being similarly positioned with respect to the dribble channel of said scale flow hopper.

6. In apparatus of the class described, the combination including: a substantially horizontal disc mounted for rotation about a substantially vertical axis; a tube member for delivering divided material onto said disc, said tube member being positioned thereabove and having a mouth, the edges of which are positionable close to said disc member, means for mounting said mouth and disc for relative movement, the margin of said disc extending beyond the periphery of said mouth; a plurality of bulk plow blades positioned above said disc and exterior to said tube and mouth, the lower edges of at least one of said bulk plow blades being positioned above said disc a preselected distance, at least one other of such bulk plow blades being positioned above said disc by a lesser distance; and dribble plow blade means positioned above said disc with the lower edges thereof closer thereto than said selected distance, said last mentioned other bulk plow blade being next to but angularly spaced from said dribble plow blade means as measured about the axis of rotation of said disc.

7. In apparatus of the class described, the combination including: a horizontal rotatably mounted plate; a collar member mounted above said plate with the lower edge thereof near to but spaced from said plate; means for controlling the spaced relationship between the lower edge of said collar member and said plate, the margin of said plate extending substantially beyond the periphery of said collar member; and plow blade means mounted above the surface of said plate and exterior to said collar member, whereby divided material delivered from such collar member onto such plate can be scraped from such plate in a quantity which is a function of the distance between the lower edge of such collar member and said plate, said plow blade means including a plurality of plow blades at least the innermost portions of which are disposed close to but spaced from such collar member, said plow blade means having substantially upstanding face areas which are presented to the material upon said plate exterior to said collar member, such face areas being angularly disposed relative to the periphery of said collar member in an attitude angularly offset from a radial attitude to such collar member, such offset being in the direction of angular motion of said rotatably mounted plate, selected of said plow blades having the lower edges thereof spaced above the plate a preselected primary distance for the scraping therefrom of a bulk charge, and also having selected other plow blades positioned with the lower edges thereof closer to said plate for the plowing therefrom of a dribble charge.

8. In apparatus of the class described, the combination including: a plate having a substantially horizontal top surface; a tubular conduit positioned above such plate with the mouth thereof close to but spaced from such plate; means for mounting said conduit and plate for relative movement towards and away from one another, the mouth of the conduit being at a substantially uniform distance from the plate at any selected adjusted position of said conduit and plate; plow blade means mounted exterior to said conduit and above said plate; and means for effecting relative angular movement between the top surface of said plate and said plow blade means thereby to plow over the edge of said plate divided material thereupon, such material delivered from such conduit onto such plate being scraped from such plate in a quantity which is a function of the distance between the lower edge of such conduit and said plate, said plow blade means including a plurality of plow blades at least the innermost portions of which are disposed close to but spaced from such conduit, said plow blade means having substantially upstanding face areas which are presented to the material upon said plate exterior to said conduit, such face areas being angularly disposed relative to the periphery of said conduit in an attitude angularly offset from a radial attitude to such conduit, selected of said plow blades having the lower edges thereof spaced above the plate a preselected primary distance for the scraping therefrom of a bulk charge, and also having selected other plow blades positioned with the lower edges thereof closer to said plate for the plowing therefrom of a dribble charge.

9. In apparatus of the class described, scale means having a charge receptacle; a hopper above such charge receptacle, such hopper being divided into two separate channels respectively for bulk and dribble charge flow; a plate mounted above said hopper, the top surface of said plate being substantially horizontal; means for controlling the feed of divided material onto said plate and thence to said hopper comprising a conduit member thereabove having a mouth, the edges of which are close to but spaced from the top surface of said plate; means for effecting relative movement between said conduit member and plate thereby to control the flow of such material to the plate by moving the latter toward or away from the conduit member; the margin of said plate extending substantially beyond the periphery of said conduit member; plow blade means positioned above said plate and exterior to said conduit member whereby relative movement of the plow blade means and the plate effects a plowing of the material upon the plate over the edge thereof into such hopper; selected of said plow blade means having the lower edge thereof spaced above the plate a preselected primary distance for the scraping therefrom of a bulk charge into the bulk channel of said hopper, and also having selected of the plow blade means positioned with the lower edge thereof closer to said plate for the plowing therefrom of a dribble charge into the dribble channel of said hopper; said hopper having bulk and dribble gate means respectively for said bulk and dribble channels; and means for controlling said gate means and the spaced relation of said plate and mouth in response to weighing movement of said scale means.

10. In apparatus of the class described, a scale bucket having weighing means responsive to receipt therein of a primary portion of a full charge and also responsive to receipt of the full charge; a disc rotatably mounted above said bucket; feed control means for said disc comprising a collar positioned thereabove and mounted for axial movement relative thereto whereby adjustment of such axial movement adjusts the feed of divided material through the collar onto the disc; bulk plow blade means mounted above said disc with the lower edge thereof a primary distance therefrom; dribble plow blade means also mounted above said disc but with the lower edge thereof a secondary and lesser distance therefrom; means for rotating said disc relative to said blade means thereby to plow such material off said disc; a scale flow hopper positioned between said scale bucket and disc, said hopper having separate bulk and dribble channels therein and also having bulk and dribble gate means; means for both lowering said collar and closing said bulk gate means in response to receipt in said scale bucket of said primary charge portion; and means for closing said dribble gate means in response to receipt in said scale bucket of the full charge.

11. In apparatus of the class described, scale means having a charge receptacle; a substantially horizontal disc rotatably mounted above said receptacle; feed control means for said disc comprising a conduit member positioned above said disc substantially coaxial therewith and mounted for axial movement relative thereto; stationary bulk plow blade means mounted with the lower edge thereof a primary distance from said disc; stationary dribble plow blade means mounted with the lower edge thereof a lesser distance from said disc; and means for controlling the axial motion of said conduit member in response to weighing movement of said scale means.

12. In apparatus of the class described, a scale flow hopper having two separate channels therein respectively for bulk and dribble charge flow and having bulk and dribble gate means respectively for such channels; disc feeder means for such scale flow hopper positioned above the latter, said disc feeder means including a disc member mounted for rotation on a substantially vertical axis, means for feeding divided material onto said disc member including a feeder tube, said tube having a mouth, the edge of which is positioned substantially close to but spaced from the disc and movable relative thereto to regulate the gap therebetween, thereby to adjust the flow of such material, the margin of said disc member extending substantially beyond the periphery of the mouth of the tube; bulk plow blade means positioned with the lower edges thereof a primary selected distance above said disc member and exterior to said tube for moving the material into the aforementioned bulk channel of the scale flow hopper in response to rotation of said disc member; dribble plow blade means positioned with the lower edges thereof a lesser distance above said disc member for plowing the material into the dribble channel of such scale flow hopper; scale means having a scale bucket beneath said scale flow hopper; and means for controlling said gate means and the gap between said disc and tube mouth in response to weighing movement of said scale bucket.

13. In apparatus of the class described, a plate member having a substantially horizontal top surface; means for mounting said plate member for rotation about a substantially vertical axis; means for controlling a flow of divided material onto such plate member comprising a tube; means for mounting said tube and plate member for relative movement toward and away from one another, the margin of said plate member extending beyond the periphery of said tube; and plow blade means positioned above said plate member close to but spaced therefrom and exterior to said tube, whereby the material delivered from such tube onto such plate member can be scraped from the latter in a quantity which is a function of the distance between the lower edge of such tube and said plate member, said plow blade means including a plurality of plow blades at least the innermost portions of which are disposed close to but spaced from such tube, said plow blade means having substantially upstanding face areas which are presented to the material upon said plate exterior to said tube, such face areas being angularly offset from a radial attitude to such tube, such offset being in the direction of angular motion of said rotatably mounted plate, selected of said plow blades having the lower edges thereof spaced above the plate a preselected primary distance for the scraping therefrom of a bulk charge, and also having selected other plow blades positioned with the lower edges thereof closer to said plate for the plowing therefrom of a dribble charge.

14. In apparatus of the class described, the combination incuding: a substantially horizontal disc mounted for rotation about a substantially vertical axis; a tube member for delivering divided material onto said disc, said tube member being positioned thereabove and having a mouth, the edges of which are substantially parallel to said disc member, means for mounting said mouth and disc for relative movement, the margin of said disc extending beyond the periphery of said mouth; bulk plow blade means positioned above said disc and exterior to said tube and mouth, the lower edges of said bulk plow blade means being positioned above said disc a preselected distance; dribble plow blade means postioned above said disc with the lower edges thereof closer thereto than said selected distance; a scale flow hopper positioned beneath said disc and being divided into two separate channels respectively for bulk and dribble flow, said bulk plow blade means being positioned for moving the material into such bulk channel and said dribble plow blade means being similarly positioned with respect to the dribble channel of said scale flow hopper; bulk gate means for said scale flow hopper bulk channel and dribble gate means for said scale flow hopper dribble channel; a scale bucket positioned beneath said bulk and dribble gate means; scale means for such scale bucket; and means for controlling the spaced relationship between said disc and tube and also for controlling said gate means in response to weighing movement of said scale bucket.

15. In apparatus of the class described, the combination including: a substantially horizontal disc mounted for rotation upon a substantially vertical axis; a tube member for delivering divided material onto said disc such tube member being positioned thereabove and having a mouth located over the center region of such disc such mouth being directed downwardly onto the disc; means for mounting said tube and disc for relative movement towards or away from one another, the margin of said disc extending beyond the periphery of such mouth; bulk plow blade means positioned above said disc and extending from said tube to the edge of said disc, the lower edges of said bulk plow blade means being positioned above said disc at a selected distance; dribble plow blade means positioned above said disc with the lower edges thereof closer to such disc than the lower edges of such bulk plow blade means; a scale flow hopper positioned beneath said disc and divided into two separate channels respectively for bulk and dribble flow, said bulk plow blade means being positioned for plowing the material off such disc and into such bulk channel, and said dribble plow blade means being similarly positioned with respect to the dribble channel of such scale flow hopper; bulk gate means for such bulk channel and dribble gate means for such dribble channel; scale means having a charge receptacle; means for closing said bulk gate for bridging the mouth of said tube closer to said disc substantially simultaneously in response to receipt in said charge receptacle of a bulk charge of selected weight less than the weight of a full charge, the closing of said bulk gate and such moving of said mouth and disc closer together trapping a selected bulk reserve charge within said bulk channel and on said disc, the continued relative movement of said disc and bulk plow blade means urging such trapped portions on said disc over the edge thereof and into the bulk channel.

16. In apparatus of the class described, a scale flow hopper having two separate channels therein respectively for bulk and dribble charge flow and having bulk and dribble gate means respectively for such channels; disc feeder means for such scale flow hopper positioned above the latter, said disc feeder means including a disc member mounted for rotation on a substantially vertical axis, means for feeding divided material onto said disc member including a feeder tube, said tube having a mouth which is directed downwardly toward the disc and relatively close to but spaced therefrom and further is mounted for movement relative thereto to regulate the gap therebetween thereby to adjust the flow of such material, the margin of said disc member extending substantially beyond the periphery of the mouth of said tube; bulk plow blades positioned with the lower edges thereof a primary selected distance above said disc member and positioned for moving the material into such bulk channel of the scale flow hopper in response to relative angular movement of said blades and disc member; dribble plow blades positioned with the lower edges thereof a lesser distance above said disc member for plowing the material into such dribble channel of said scale flow hopper in response to relative angular movement of said disc member and dribble plow blades; scale means having a scale bucket beneath said scale flow hopper, and means for reducing the gap between said disc and tube mouth and substantially simultaneously closing said bulk gate means thereby trapping a selected bulk reserve charge within said bulk channel and on said disc member in response to weighing movement of such scale bucket resulting from receipt therein of a selected bulk charge; and means for closing said dribble gate means in response to further weighing movement of such scale bucket resulting from receipt therein of a full charge.

References Cited in the file of this patent

UNITED STATES PATENTS

| Number | Name | Date |
|---|---|---|
| 315,730 | Clawson | Apr. 14, 1885 |
| 570,108 | Smyser | Oct. 27, 1896 |
| 756,298 | Tench | Apr. 5, 1904 |
| 911,816 | Gielow | Feb. 9, 1909 |
| 1,006,879 | Richardson | Oct. 24, 1911 |
| 1,746,776 | Jones et al. | Feb. 11, 1930 |
| 1,755,103 | Davis | Apr. 15, 1930 |
| 2,373,831 | Howard | Apr. 17, 1945 |
| 2,394,476 | Pipping | Feb. 5, 1946 |
| 2,443,350 | Gilbert et al. | June 15, 1948 |
| 2,544,210 | Zenke et al. | Mar. 6, 1951 |
| 2,610,726 | Howard | June 16, 1952 |
| 2,726,061 | Schieser et al. | Dec. 6, 1955 |

FOREIGN PATENTS

| Number | Country | Date |
|---|---|---|
| 164,718 | Great Britain | Nov. 17, 1921 |
| 395,235 | Great Britain | July 13, 1933 |
| 746,388 | Germany | May 12, 1943 |
| 737,856 | Germany | July 26, 1951 |
| 702,444 | Great Britain | Jan. 13, 1954 |